(No Model.)

M. ROTHSCHILD.
TOOL FOR BORING SQUARE HOLES.

No. 297,013.                    Patented Apr. 15, 1884.

WITNESSES:
William Miller
Otto Aufeland

INVENTOR
Maier Rothschild
BY Van Santvoord & Hauff
ATTORNEYS

UNITED STATES PATENT OFFICE.

MAIER ROTHSCHILD, OF SHAMOKIN, PENNSYLVANIA.

TOOL FOR BORING SQUARE HOLES.

SPECIFICATION forming part of Letters Patent No. 297,013, dated April 15, 1884.

Application filed November 8, 1883. (No model.)

*To all whom it may concern:*

Be it known that I, MAIER ROTHSCHILD, a citizen of the United States, residing at Shamokin, in the county of Northumberland and State of Pennsylvania, have invented new and useful Improvements in Tools for Boring Square Holes, of which the following is a specification.

The object of this invention is to provide a novel and efficient hand-tool for boring square holes; and to this end the invention consists in the construction and combination of devices hereinafter described and claimed, reference being had to the accompanying drawings, in which—

Figure 1:
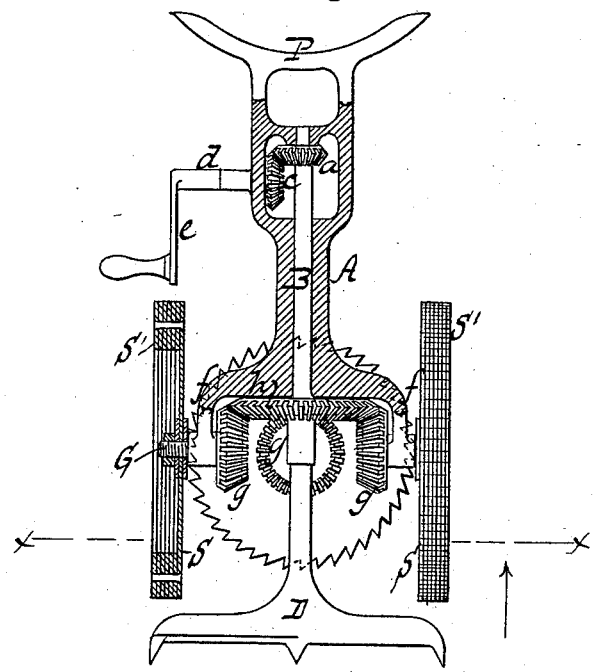
Figure 2:
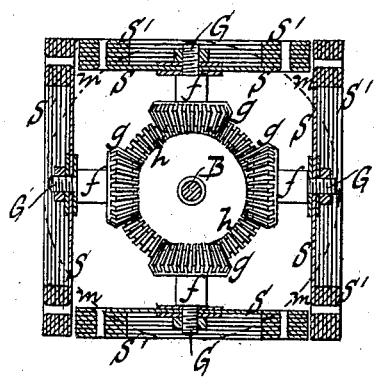

Figure 1 represents a longitudinal central section. Fig. 2 is a transverse section in the plane x x, Fig. 1.

Similar letters indicate corresponding parts.

In the drawings, the letter A designates the stock of my tool, which is provided with breast-plate P, so that by placing this plate against the breast the requisite pressure can be brought upon the tool in boring. The stock A is bored out in the direction of its length, to receive the longitudinal spindle B, which carries the drill D.

If my tool is intended for operating on wood, the drill may be made in the form of an ordinary center-bit, as shown in the drawings; but if the tool is to be used for operating on stone, coal, or other like materials, a drill of suitable material—such, for instance, as a diamond-drill—must be used.

On the spindle B, near its inner end, is mounted a bevel-wheel, a, which gears into a bevel, c, mounted on a transverse spindle, d, to which a revolving motion can be imparted by a hand-crank, e.

Instead of the hand-crank and spindle d, other suitable means may be substituted for imparting to the longitudinal spindle B the required revolving motion.

The outer end of the stock A is provided with four arms, f, which form the bearings for the transverse spindles G. On the other end of each of these spindles is mounted a circular saw, S, which may be made of steel or of any other suitable material, according to the material to be operated upon. If the tool is to be used for boring holes in stone, coal, or other like material, the saws must be provided with diamond teeth.

On the inner ends of the spindles G are mounted bevel-wheels g, which gear into a bevel-wheel, h, mounted on the longitudinal spindle B. If the drill is brought to bear upon wood or other material, and a revolving motion is imparted to the same, a round hole is bored by said drill, and by the action of the saws four grooves are cut, whereby the corner pieces, m, are isolated, and by breaking off these corner pieces with a wedge or other suitable means a square hole is produced.

In order to allow my tool to enter the wood or other material to a depth beyond the centers of the saws, I have secured to the outer surface of each saw an annular saw, S', so that the groove cut by each saw is wide enough to admit the outer ends of the spindles G. Such annular saws may be made of a series of annular saw-blades riveted to the main saws; or they may be produced out of one and the same piece with the main saws, according to the nature of the material to be operated upon.

What I claim as new, and desire to secure by Letters Patent, is—

1. A boring-tool combining in its structure a stock, A, having four projecting arms, f, the spindle B, passing longitudinally through the stock and carrying the drill D, the four independent transverse spindles G, mounted, respectively, in the arms on the stock, a circular saw, S, mounted on each transverse spindle, and through which the latter passes, a secondary saw, S', in the form of an annulus, connected with the outer face of each saw at its periphery, to cut a passage-way for the outward-projecting ends of the transverse spindles, and means for revolving all the spindles, substantially as described.

2. The combination, in a boring-tool, of the stock A, having the breast-plate P at its outer end, and four projecting arms, f, at its other end, the spindle B, passing longitudinally through the stock and carrying the drill D, the four independent transverse spindles G, mounted, respectively, in the arms on the stock, a circular saw, S, mounted on each transverse spindle, and means for revolving all the spindles, substantially as described.

In testimony whereof I have hereunto set my hand and seal in the presence of two subscribing witnesses.

MAIER ROTHSCHILD. [L. S.]

Witnesses:
W. HAUFF,
E. F. KASTENHUBER.